United States Patent [19]
Bodner et al.

[11] 3,961,313
[45] June 1, 1976

[54] COMPUTER CONTROL APPARATUS

[75] Inventors: Ronald E. Bodner; Thomas L. Crooks, both of Rochester, Minn.; Israel B. Magrisso, Coral Springs, Fla.; Keith M. Slack, Rochester, Minn.; Richard S. Smith, Boca Raton, Fla.

[73] Assignee: International Business Machines Corporation, Armonk, N.Y.

[22] Filed: Dec. 4, 1974

[21] Appl. No.: 529,677

[52] U.S. Cl. ............................................ 340/172.5
[51] Int. Cl.² ........................................... G06F 9/18
[58] Field of Search ............................... 340/172.5

[56] References Cited
UNITED STATES PATENTS

| | | | |
|---|---|---|---|
| 3,417,379 | 12/1968 | Heard et al. | 340/172.5 |
| 3,656,123 | 4/1972 | Carnevale et al. | 340/172.5 |

*Primary Examiner*—Gareth D. Shaw
*Assistant Examiner*—C. T. Bartz
*Attorney, Agent, or Firm*—Donald F. Voss

[57] ABSTRACT

The first time period of the instruction fetch cycle is eliminated when fetching the branch to instruction in a computer system operating in a non-overlap mode. Whenever a branch instruction is decoded, the storage address register (SAR) is directly loaded during execution of the branch instruction with certain bits from a storage data register (SDR) concatenated with certain bits from an operand register to form the branch to address in SAR. The instruction counter is incremented in the usual manner but the incremented address is not loaded into SAR. The clock is advanced to the second rather than the first time state of the next instruction fetch cycle. Thereafter, the branch to address which is residing in the operand register, is incremented and loaded into the instruction counter.

8 Claims, 11 Drawing Figures

① CONTENTS OF AR (ADDRESS REG IN LSR STACK) LOADED INTO SAR & X-REG
② BRANCH-TO-ADDRESS (FORMED FROM X-REG & SDR) LOADED INTO SAR & X-REG
③ ADDR/OPERAND LOADED IS DEPENDENT UPON THE TYPE OF INSTR'N DECODED DURING LAST HALF OF T2
④ INSTRUCTION DECODE TIME - OUTPUTS ARE VALID THROUGHOUT EXECUTION PHASE

BRANCH INSTRUCTION TIMING

FIG. 6

① CONTENTS OF AR LOADED INTO SAR & X-REG

②•BRANCH TO ADDRESS LOADED INTO SAR & X-REG IF CONDITION IS MET
 •NSI ADDRESS LOADED INTO SAR & X-REG FROM AR IF CONDITION IS NOT MET
 •RETURN ADDRESS FROM ADDRESS BACKUP REG LOADED INTO SAR & X-REG IF "RETURN" INSTR

③ ADDRESS/OPERAND LOADED INTO SAR & X-REG IS DEPENDENT UPON THE TYPE OF INSTRUCTION

∗•ADDRESS BEING INCREMENTED IS BRANCH-TO-ADDRESS IF THE BOC CONDITION WAS MET
 •ADDRESS BEING INCREMENTED IS FROM AR OR BACKUP REG FOR BOC CONDITION NOT MET OR RETURN INSTRUCTION RESPECTIVELY

∗∗•SDR$_{LO}$ SELECTED FOR BOC IF CONDITION IS MET
 •LSR$_{LO}$ SELECTED FOR BOC IF CONDITION IS NOT MET OR IF INSTR IS A "RETURN" INSTRUCTION

BRANCH ON CONDITION & RETURN INSTRUCTION TIMINGS

FIG. 7

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | BRANCH ADDRESS | | | | | | | | | | | |

BRANCH INSTRUCTION

FIG. 8a

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 1 | 0 | COND | | | | PAGE ADDRESS | | | | | | | |

BRANCH ON CONDITION INSTR'N

FIG. 8b

| | T0 | T1 | T2 | T3 | T4 | T5 | T6 |
|---|---|---|---|---|---|---|---|
| BRANCH OR BRANCH ON CONDITION | | | | | | | |
| SELECT LSR$_{AR}$ (BR, BOC $\overline{RTN}$) | | | | ─── | | ─── | |
| SELECT LSR$_{AB}$ (BOC$_{RTN}$) | | | | ─── | | ─── | |
| SELECT STG GT$_N$ = LSR$_N$ (BOC) | | | | ─── | ─ ─ | ─ ─ | ─ ─ |
| SELECT STG GT$_N$ = X$_H$(0-3)/SDR$_H$(4-7) | | | | ─── | | | |
| SELECT STG GT$_L$ = LSR$_L$ (BOC $\overline{MET}$+RTN) | | | | ─── | ─ ─ | ─ ─ | ─ ─ |
| SELECT STG GT$_L$ = SDR$_L$ (BR+BOC$_{MET}$) | | | | ─── | | | |
| CLOCK X$_{H/L}$, SAR (DONT CARE) | | | | ─ | | | |
| CLOCK STG GT CHECK | | | | ─ | | | |
| CONTROL STG ACCESS | | | | ─────────── | | | |
| STORAGE CYCLE | | | | | ────── | | |
| CLOCK SDR | | | | | ────── | | |
| ALU FUNCTION = PASS | | | | ─ ─ | ─ ─ | ─ ─ | ─ ─ |
| ALU GT$_{H/L}$ = ALU$_{H/L}$ | | | | ─ ─ | ─ ─ | ─ ─ | ─ ─ |
| WRITE LSR$_{H/L}$ | | | | | | ─ | |
| CLOCK ALU GT CHECK | | | | | | ─ | |

FIG. 9

COMPUTER CONTROL APPARATUS

BACKGROUND OF THE INVENTION

1. Field of the Invention

The invention relates to control apparatus in a stored program computer system and more particularly to such control apparatus where the computer operates in a non-overlap mode and still more particularly to such control apparatus where the instruction cycle for the computer system includes an instruction fetch cycle having at least more than one time state and an instruction execution cycle immediately following the instruction fetch cycle.

The present invention finds particular utility in small computer systems, where for cost reasons, parallel paths are not provided and thus the computer operates in a non-overlapped mode. In the non-overlapped mode, an instruction fetch cycle is followed by an instruction execution cycle. In the overlapped mode, execution of one instruction takes place while the next instruction is being fetched. The present invention enables variable length instruction fetch cycles so as to increase the overall efficiency of the computer system operating in the non-overlapped mode. whenever a branch instruction is encountered, the instruction fetch cycle of the branch to instruction is shortened by one time state. This time savings is significant because approximately 40% of the instructions in a non-overlapped computer system are branch instructions.

2. Prior Art

In the past, it has been the practice to have fixed length instruction fetch cycles. Improved performance was achieved by executing one instruction during the fetch of the next instruction. Such arrangements require dual registers for holding a pair of instructions and other additional data paths which are cost prohibitive in low cost computer systems.

In U.S. Pat. No. 3,766,527 an instruction execution cycle overlaps the instruction fetch cycle; however, the overlap is fixed and there is no variable length instruction fetch cycle.

The time for execution of branching operations is masked in U.S. Pat. No. 3,753,236 but more elaborate apparatus is required and the instruction fetch cycle is not variable. The execution of a high order micro instruction of a pair of micro instructions is overlapped with decoding of a low order branch instruction and the address preparation and fetch of the next pair of micro instructions. If a non-branch, low order instruction is encountered, it is transferred to the high order register for execution after the high order instruction is executed. In the present invention, only a single instruction is fetched and if it is a branch instruction, the address for the branch to address is set up during the execution of the branch instruction and the first time state of the instruction fetch cycle for the branch to instruction is skipped by selectively advancing the central processing unit (CPU) clock.

SUMMARY OF THE INVENTION

The principal objects of the invention are to provide improved control apparatus for a stored program computer which:

a. provides a variable length instruction fetch cycle,
b. reduces the instruction fetch time for branch to instructions, and
c. increases the over-all efficiency of the computer system at a relatively low cost.

The foregoing objects of the invention are achieved by inhibiting the loading of the storage address register (SAR) with the contents of the instruction counter or address register and loading it instead with data representing the branch to instruction address formed from partial contents of the storage data register (SDR) and an operand register whose contents are equal to the instruction address register minus one. The central processing unit clock is then advanced so as to skip the first time state of the instruction fetch cycle and the address already in SAR is used for fetching the branch to instruction, thereby saving the time normally consumed by the first time state of the instruction fetch cycle.

The first time state of the instruction fetch cycle, if permitted to occur, is used to again load SAR with a storage address. Since the proper address is already in SAR, the first time state can be eliminated. During the remainder of the fetch cycle, the branch to address which is formed in the operand register simultaneously with its entry into SAR, is incremented and the incremented address is loaded into the instruction counter. Then, after the instruction at the branch to address is executed, SAR is loaded during the first time state of the next instruction fetch cycle with the contents of the instruction counter, assuming that the branch to instruction is not a branch instruction. If it is a branch instruction, SAR is loaded as previously indicated and the first time state of the next instruction fetch cycle is skipped.

DESCRIPTION

Figure 1:
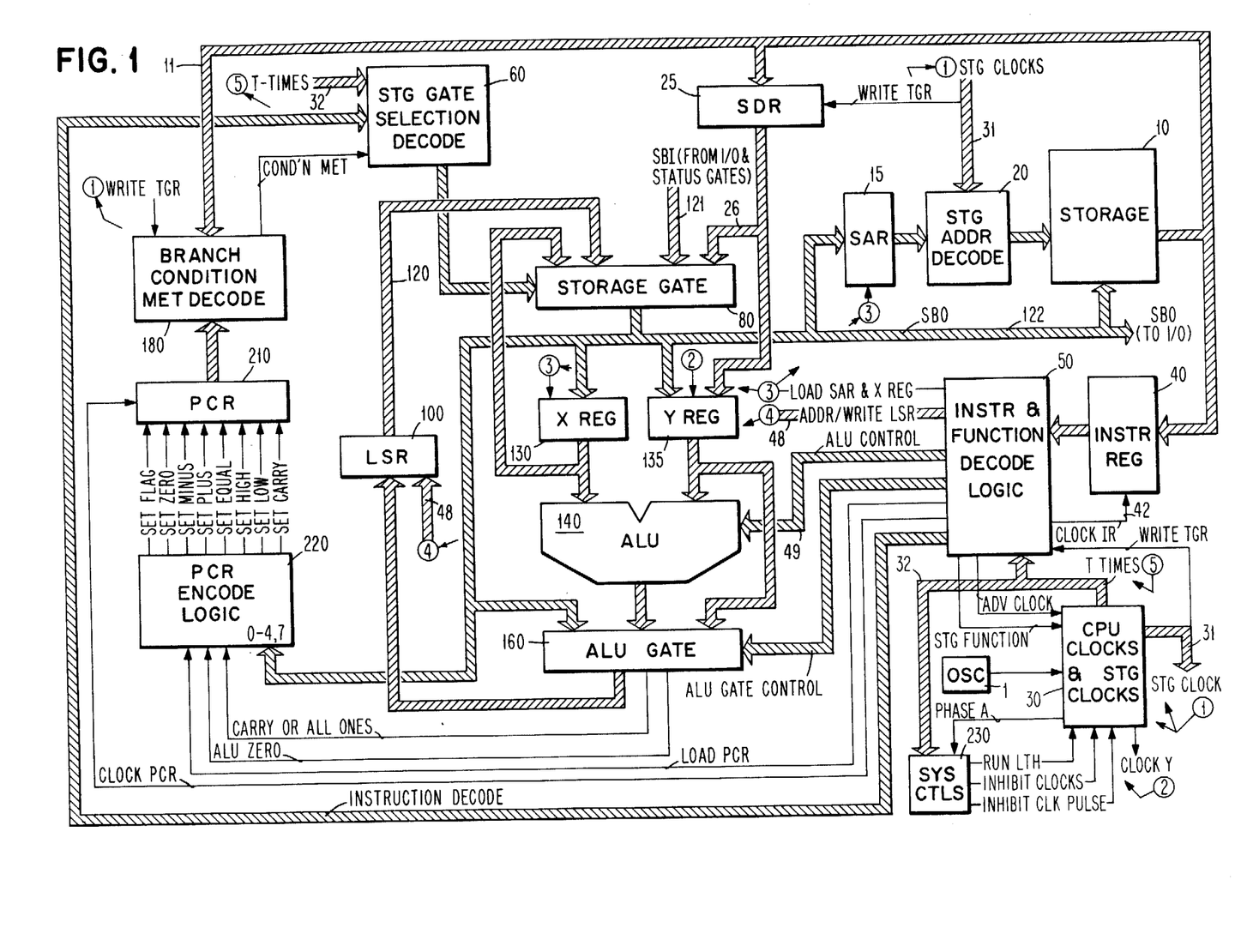
FIG. 1 is a schematic block diagram illustrating a stored program computer system (excluding the I/O devices) incorporating the present invention, FIGS. 2a and 2b taken together with FIG. 2a disposed above FIG. 2b are a schematic logic diagram illustrating the controls for controlling entry of data into the storage address register and operand register of the system shown in FIG. 1.

With reference to the drawings and particularly to FIG. 1, the invention is illustrated by way of example as being incorporated in a computer system which includes storage 10 for storing both instructions and data. Instructions and data in storage 10 are accessed by storage address register (SAR) 15 which provides a sixteen bit address to storage address decode logic 20. Logic 20 also receives storage clock signals over bus 31 from CPU and storage clocks 30.

Instructions, in this example, are sixteen bits in length and are entered simultaneously into instruction register 40 and storage data register 25 over bus 11. Register 40 is closed by a CLOCK IR signl on line 42 formed in instruction and function decode logic 50 from timing signals supplied by clocks 30 over bus 32. Register 25 is loaded under control of a WRITE TGR signal from bus 31.

Figure 8A:
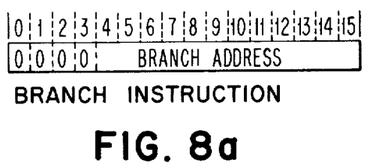
FIGS. 8a and 8b are diagrams schematically illustrating the formats of branch and branch on condition instructions respectively; and, FIG. 9 is a timing diagram illustrating the execution time of branch or branch on condition instruction when operating in a stop or single step mode.
Figure 8B:
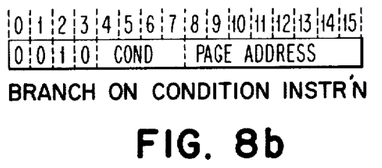

The instruction and function decode logic 50 decodes the operation code of instructions by logically operating upon bits 0–3 of the instruction. Branch and branch on condition instructions have an operation code of 0000 and 0010, respectively, see FIG. 8. The logic for decoding branch and branch on condition instructions is shown in FIG. 2b as including inverters 53–56 inclusive and AND circuits 57 and 58. The output of AND circuit 57 is indicative of a branch instruction and it is applied to OR circuit 59 to facilitate the development of an Advance Clock signal from AND circuit 51 at T3 time. OR circuit 59 also receives a signal from AND circuit 58 whose output indicates a branch on condition instruction. The Advance Clock signal, which will be described in greater detail later herein, is used to control clocks 30 so as to skip the first time state T0 of the branch to instruction fetch cycle.

The signals from AND circuits 57 and 58 are also used by storage gate selection decode logic 60. Decode logic 60 includes AND circuits 61 and 62 and OR circuit 63 for developing a STG GATE LO SEL 1 signal on line 64. This signal as it will be seen shortly is used to control selection of low order storage gates of storage gates 80, FIG. 2a. Another selection signal for the low order storage gates is STG GATE LO SEL 0 on line 66 from decode logic 47. Decode logic 47 is responsive to bits in instruction register 40 for producing several different signals. The STG GATE LO SEL 0 signal, as will be seen later herein, is not present for branch and branch on condition instructions. The high order selection gates are selected by STG GATE HI SEL 1 and STG GATE HI SEL 0 signals on lines 68 and 70 from AND circuits 67 and 69, respectively.

The low order storage gates include AND circuits 81–84 inclusive feeding OR circuit 85. Each of the AND circuits 81–84 is really representative of a plurality of AND circuits where AND circuit 81 receives low order bits 8–15 over bus. 120 connected to outputs from a stack of local storage registers (LSR's) 100. AND circuit 81 is gated by the output of inverters 71 and 72. The data inputs to AND circuit 82 are from the low order bits 8–15 of register 25 over bus 26. AND circuit 82 is gated by the outputs of OR circuit 63 and inverter 71.

AND circuit 83 receives low order bits 8–15 from the System Bus In 121 and is gated by the outputs of decode 47 and inverter 72.

AND circuit 84 receives data input bits from OR circuit 90 which is fed by high order storage gates 86–89 inclusive. AND circuit 84 is gated by outputs of decode 47 and OR circuit 63.

The outputs of the low order storage gates taken from OR circuit 85 feed low order bit inputs 8–15 of SAR 15, of X Register 130 and of System Bus Out 122.

The manipulation of the low order storage gates will be described in greater detail during the description of forming the address for the branch to instruction.

The high order storage gate AND circuits 86, 87 and 88 have high order bit inputs 0–7 from buses 120, 26 and 121 respectively. AND circuit 89 has high order input bits 4–7 from bus 26 and high order input bits 0–3 from X Register 130. AND circuit 86 is gated by the outputs of inverters 73 and 74, whereas AND circuit 87 is gated by the outputs of AND circuit 67 and inverter 74. The outputs of AND circuit 69 and inverter 73 gate AND circuit 88 and the outputs of AND circuits 67 and 69 gate AND circuit 89.

The outputs of the high order storage gates taken from OR circuit 90 feed the high order bit inputs 0–7 of SAR 15, of X Register 130, of System Bus Out 122 and of AND circuit 84. The manipulation of the high order storage gates will be described in greater detail later herein.

It should be noted that one of the inputs to AND circuits 61 comes from the output of OR circuit 202 of Branch Condition Met Decode logic 180. This logic also includes inverters 181–186 inclusive and AND circuits 187–201 inclusive. The fifteen AND circuits 187–201 are fed by the output of instruction bits 4–7 decode logic 203 which includes a register and decode logic for decoding bits 4–7 from storage bus 11. The various gating signals for AND circuits 187–201 are from the inverters 181–186, from processor condition register 210 and from the I/O channel. Bits 4–7 of the Branch On Condition instruction set forth the branch condition.

The processor condition register 210 is an eight bit register set under control of processor condition register encode logic 220, FIG. 1. The encode logic 220 is not shown in detail but consists of conventional logic circuitry responsive to outputs from instruction and function decode logic 50, from storage gates 80 and from arithmetic and logic unit (ALU) gates 160.

It should also be noted that the instruction register 40 is clocked by the output of AND circuit 52, FIG. 2b, which receives T1 through T2 and Write TRG signals from clocks 30 and a signal from inverter 43. The SAR and X Registers 15 and 130 are clocked by a signal from AND circuit 45. AND circuit 45 is fed by a Phase A clock signal and by the output of OR circuit 44 which receives T0 and T3 clock signals. As a matter of interest, there are other inputs to OR circuit 44 from clock 30 and decode 47 for developing the LOAD SAR and X REG signal for operations not pertinent to this invention. The processor condition register 210 is clocked by a CLOCK PCR signal from decode logic 47 which also provides LSR ADDRESS and ALU CONTROL signals on buses 48 and 49 respectively. It should be recognized that all of the decode logic 50 is not shown in detail because much of the logic is not pertinent to the present invention, but of course is required for the computer system for decoding instructions other than the branch and branch on condition instructions.

Figure 4:
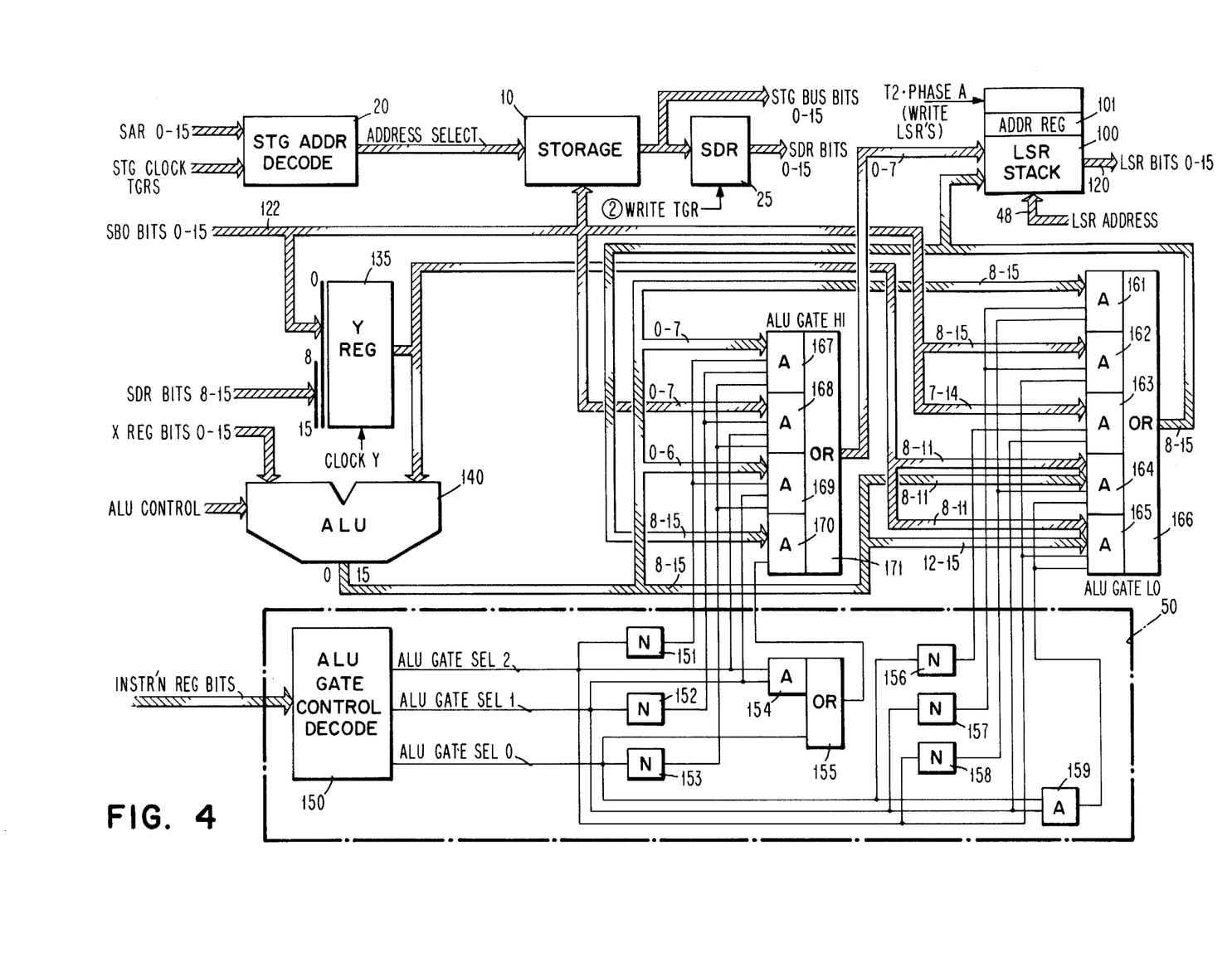
FIG. 4 is a schematics logic diagram illustrating the controls for controlling the updating of the instruction counter for branch operations.

The instruction decode logic 50 also includes logic for controlling ALU GATES 160, FIGS. 1 and 4. ALU GATE CONTROL DECODE logic 150, FIG. 4, includes conventional logic responsive to the bits in instruction register 40 to develop ALU GATE SEL 0, ALU GATE SEL 1, and ALU GATE SEL 2 signals. These signals are used for controlling ALU GATES LO and ALU GATES HI. ALU GATES LO include AND circuits 161–165 inclusive feeding OR circuit 166.

AND circuit 161 is gated by the outputs of inverters 157 and 158 while AND circuit 162 is gated by the output of inverter 157 and the ALU GATE SEL 2 signal. AND circuit 163 is gated by the output of INVERTER 156 and the ALU GATE SEL 1 signal. The outputs of inverter 158 and AND circuit 159 gate AND circuit 164. The output of AND circuit 159 is also used to gate AND circuit 165 together with the ALU GATE SEL 2 signal.

AND circuits 161, 162 and 163 have data inputs of ALU bits 8–15, SBO bits 8–15 and SBO bits 7–14, respectively. AND circuit 164 has data inputs of Y REG 135 bits 8–11 and ALU 140 bits 8–11, whereas AND circuit 165 has data inputs of Y REG 135 bits 8–11 and ALU 140 bits 12–15. The output of OR circuit 166 includes bits 8–15 which feed the stack of LSR registers 100 and AND circuit 170 of the ALU GATES HI. The other AND circuits 167, 168 and 169 of ALU GATES HI have data inputs from bits 0–7 of ALU 140, bits 0–7 of SBO 122, and bits 0–6 of ALU 140, respectively. Bits 0–6 from ALU 140 provide the seven least significant bits to AND circuit 169. The most significant bit is forced to a zero state.

AND circuit 167 is gated by the outputs of inverters 151, 152, and 153 while AND circuit 168 is gated by the outputs of inverters 152 and 153 and by the ALU GATE SEL 2 signal. The outputs of inverters 151 and 153 and the ALU GATE SEL 1 signal gate AND circuit 169, and the output of OR circuit 155 gates AND circuit 170.

The data passed by the various ALU HI GATES is transferred via OR circuit 171 as bits 0–7 to the stack of LSR registers 100. As will be seen later herein, LSR registers 100 contain an address register (instruction counter) 101 for addressing storage 10 by means of SAR 15. The ALU GATES 160 enable the branch to instruction address to be entered into address register 101 as an incremented address from ALU 140.

Figure 2A:
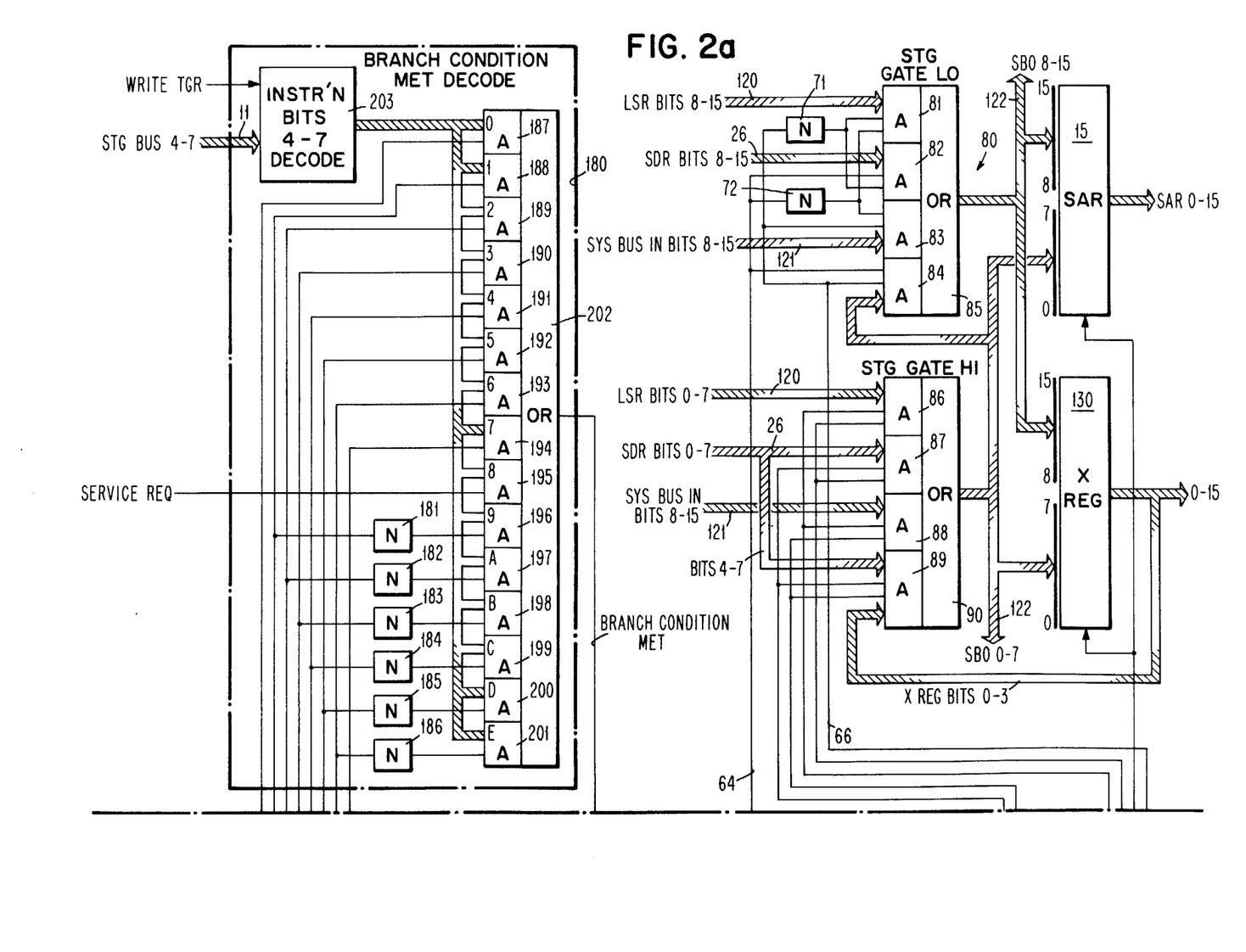
Figure 2B:
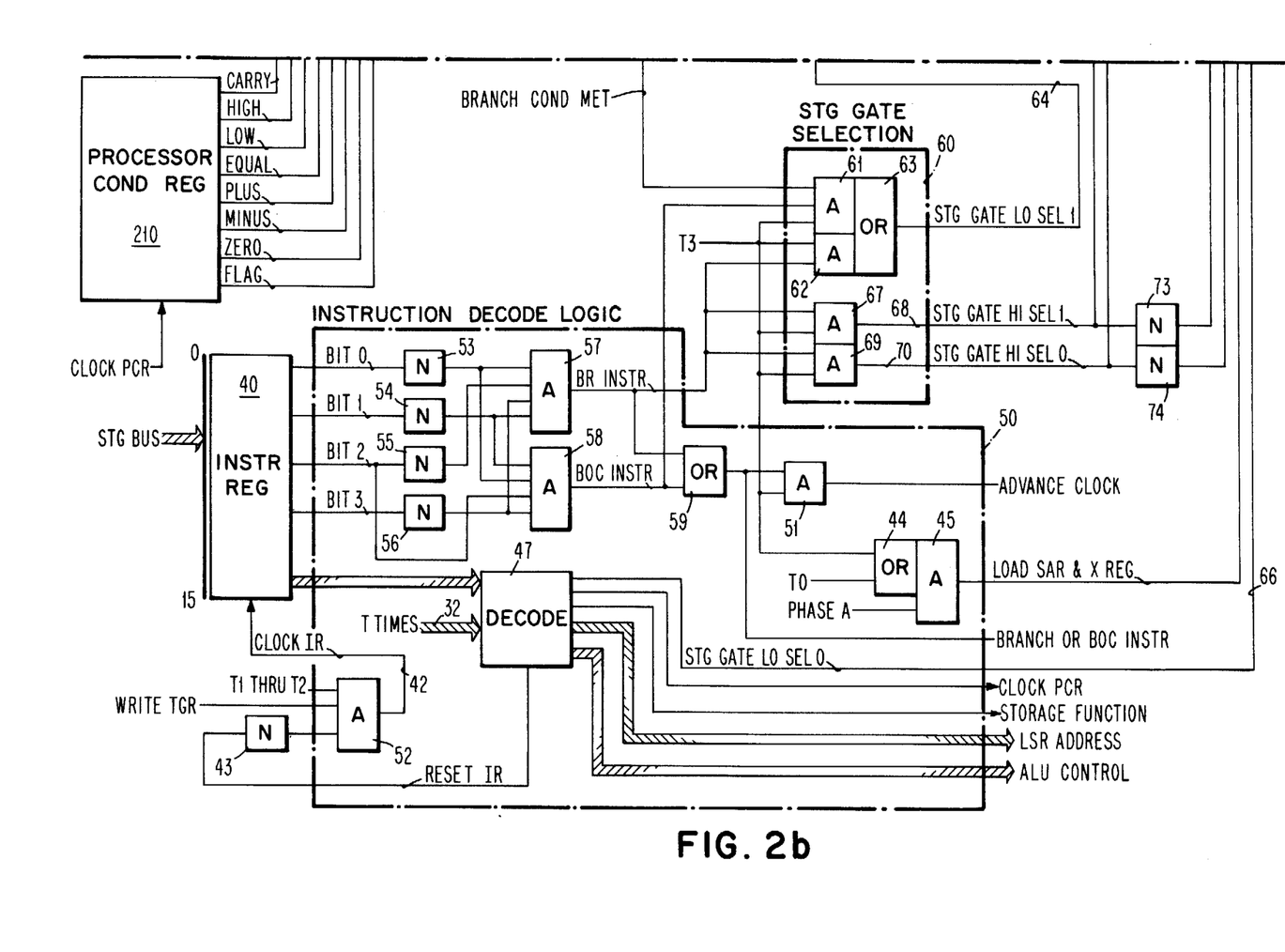

The registers in the stack of LSR registers 100 are selectively addressed for branch and branch on condition instructions by decoding instruction bits in instruction register 40, FIG. 2. Decode 47 provides selection bits over bus 48 for selecting one of the LSR registers 100.

Figure 3:
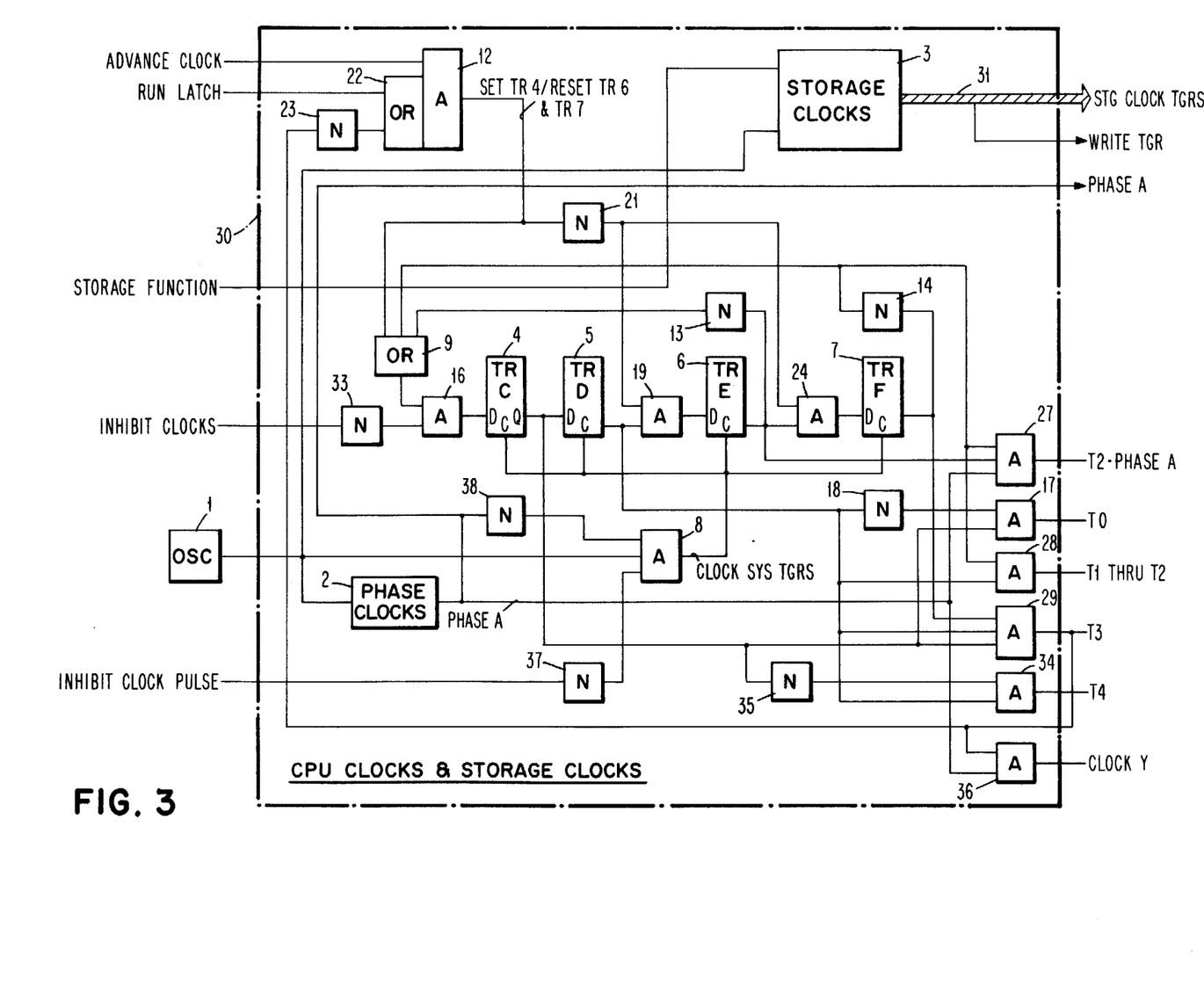
FIG. 3 is a schematic logic diagram illustrating the controls for controlling the central processing unit (CPU) clocks during the fetch and execution of branch instructions.
Figure 5:
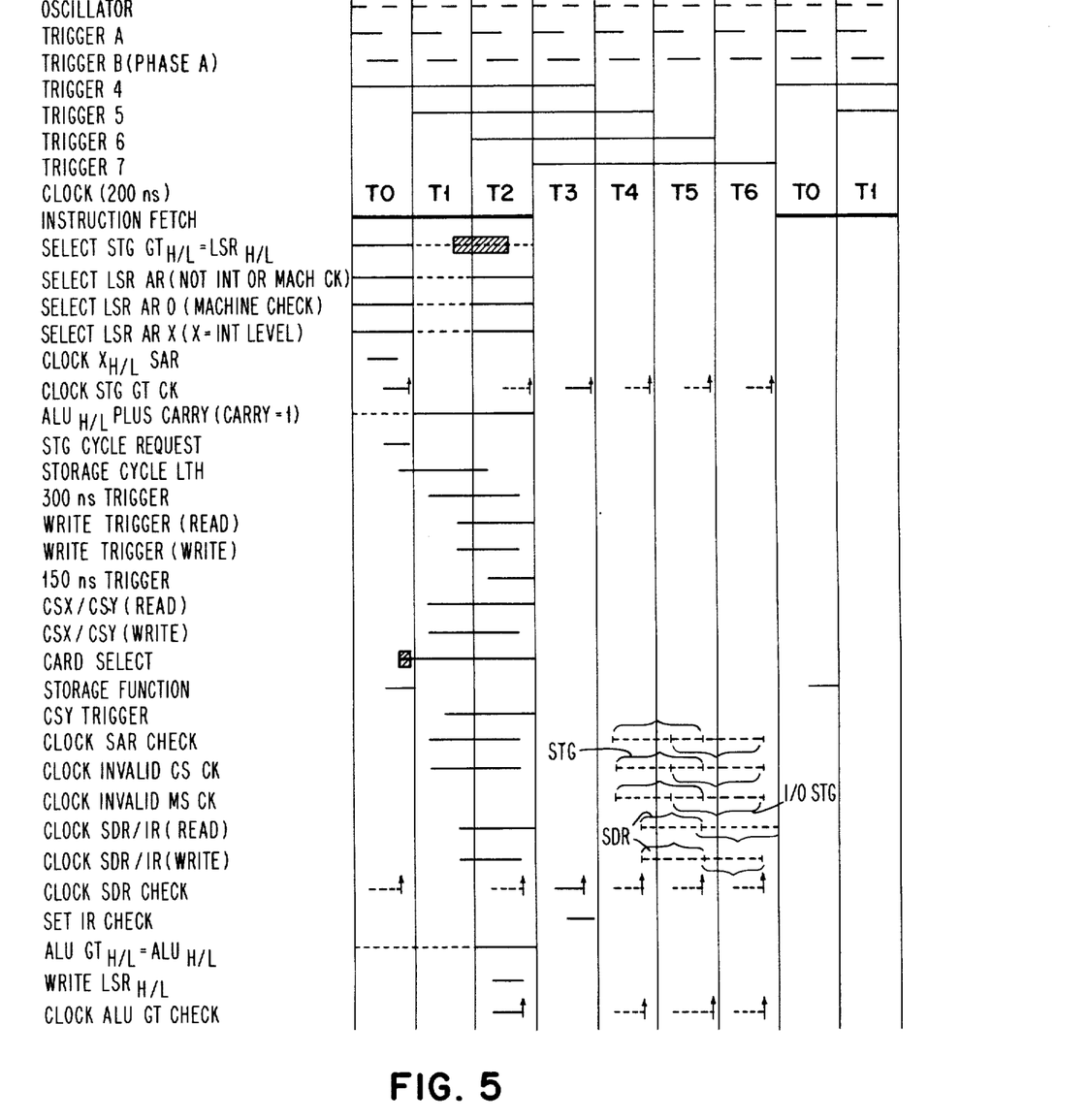
FIG. 5 is a timing diagram showing the CPU clock times and instruction fetch and execution times for non-branch instructions.

The CPU and STORAGE CLOCKS 30, FIGS. 1, 3 and 5 provide the timing for the operation of the central processing unit and storage. A free running oscillator 1 provides repetitive pulses to phase clocks 2 and storage clocks 3. Storage clocks 3 are not shown in detail but they provide a storage cycle time signal for indicating to the central processing unit that a storage cycle is occurring. They also provide CSX TIME and CSY TRIG signals used in combination with a card select signal developed from bits in SAR 15 for addressing the storage locations selected in storage 10. The WRITE TRIG signal is also developed by storage clocks 3 which is used as described above i.e., for gating registers and decode as well as for gating logic to generate write pulses for writing data into storage 10.

The phase clocks 2 produce the PHASE A signal which as indicated in FIG. 5 occurs repetitively in a free running sense. The CPU clocks consisting of triggers 4, 5, 6 and 7; however, are selectively controlled and do not operate in a free running sense. Triggers 4, 5, 6 and 7 are simultaneously clocked by a signal from AND circuit 8; however, the data input of trigger 4 is connected to the output of AND circuit 16 fed by OR circuit 9 and inverter 33. OR circuit 9 has inputs from AND circuit 12 and from inverters 13 and 14. The output of trigger 4 is used for the data input of trigger 5 and for feeding AND circuit 17 which is gated by inverter 18 fed by the output of trigger 5. The output of AND circuit 17 is time T0. Time T0 is normally used to start the instruction fetch cycle, but it is skipped when fetching an instruction following a branch or branch-on-condition instruction.

Trigger 5 also provides an output to AND circuit 19 which is gated by the output of inverter 21 and feeds the data input of trigger 6. The output of inverter 21 is indicative of a not SET TR4/RESET TR6 and TR7 signal. The SET TR4/RESET TR6 and TR7 signal comes from AND circuit 12 which receives the ADVANCE CLOCK signal from AND circuit 51 of decode logic 50. AND circuit 12 is gated by the output of OR circuit 22 which receives a RUN LATCH signal from system controls 230 and a not T3 signal from inverter 23.

The output of trigger 6 in addition to feeding inverter 13 feeds AND circuits 24 and 27. AND circuit 24 is gated by the output of inverter 21 and provides the data input to trigger 7. AND circuit 27 is gated by the PHASE A signal and will have an output signal T2 and Phase A provided trigger 7 is not feeding a signal to inverter 14. Trigger 7 must also be off in order for AND circuit 28 to have an output. AND circuit 28 passes a signal T1 thru T2. There is no requirement in this computer system to have a discrete T1 time, because whatever operation starts in T1, continues through T2.

When trigger 7 does have an output, AND circuit 29 passes a T3 signal if triggers 4 and 5 are in a set condition. The T4 signal is taken from AND circuit 34 which is fed by the outputs of trigger 5 and inverter 35. Hence, the T4 signal is present if trigger 4 is reset and trigger 5 is set. The CLOCK Y signal is formed by AND circuit 36 from a T3 signal and a PHASE A signal.

The signal from AND circuit 8 for clocking triggers 4, 5, 6 and 7 is formed from the output of inverters 37 and 38 and the pulse from oscillator 1. Hence, if an inhibit clock pulse is present, triggers 4, 5, 6 and 7 will not be clocked. Further, AND circuit 16 provides a data input to trigger 4 only if an inhibit clocks signal is not present. There are various times during operation of the computer system when the CPU CLOCK is inhibited. However, the PHASE A signal and storage clocks 3 still run even though the CPU CLOCK is inhibited. Storage clocks 3 are controlled by a storage function signal from instruction and function decode logic 50.

In addition to the clock signals shown in FIG. 5, typical instruction fetch cycles are shown. Except for instances where instructions are fetched following the branch or branch-on-condition instructions, an instruction fetch cycle starts at T0 time and continues through T2 time. AND circuits 81 and 86 in storage gates 80, high and low are selected at T0 time and the address register, there is one address register per program level (including one for each interrupt level; however, interrupt does not form a part of this invention), in LSR registers 100 is selected at T0 through T2 times. The storage address register 15 and X register 130 are clocked during T0 at phase A time. ALU 140 begins its operation at T1 time and continues through T2 time. During this time the ALU 140 is incrementing the address register. A storage cycle occurs at T1 time through T2 time. Certain checks are made during the instruction fetch cycle and the SDR 25 and instruction register 40 are clocked during T2 time. SDR 25 is clocked with a WRITE TGR signal and instruction register 40 is clocked with a CLOCK IR signal. The ALU gates 160 select the outputs from ALU 140 via AND circuits 161 and 167 for the duration of T2 and the LSR registers 100, specifically the address register are written during T2 time at phase A under control of the signal from AND circuit 27. Instruction execution begins at T3 time and, depending upon the instruction being executed, the execution cycle can continue through T6 time.

Figure 6:
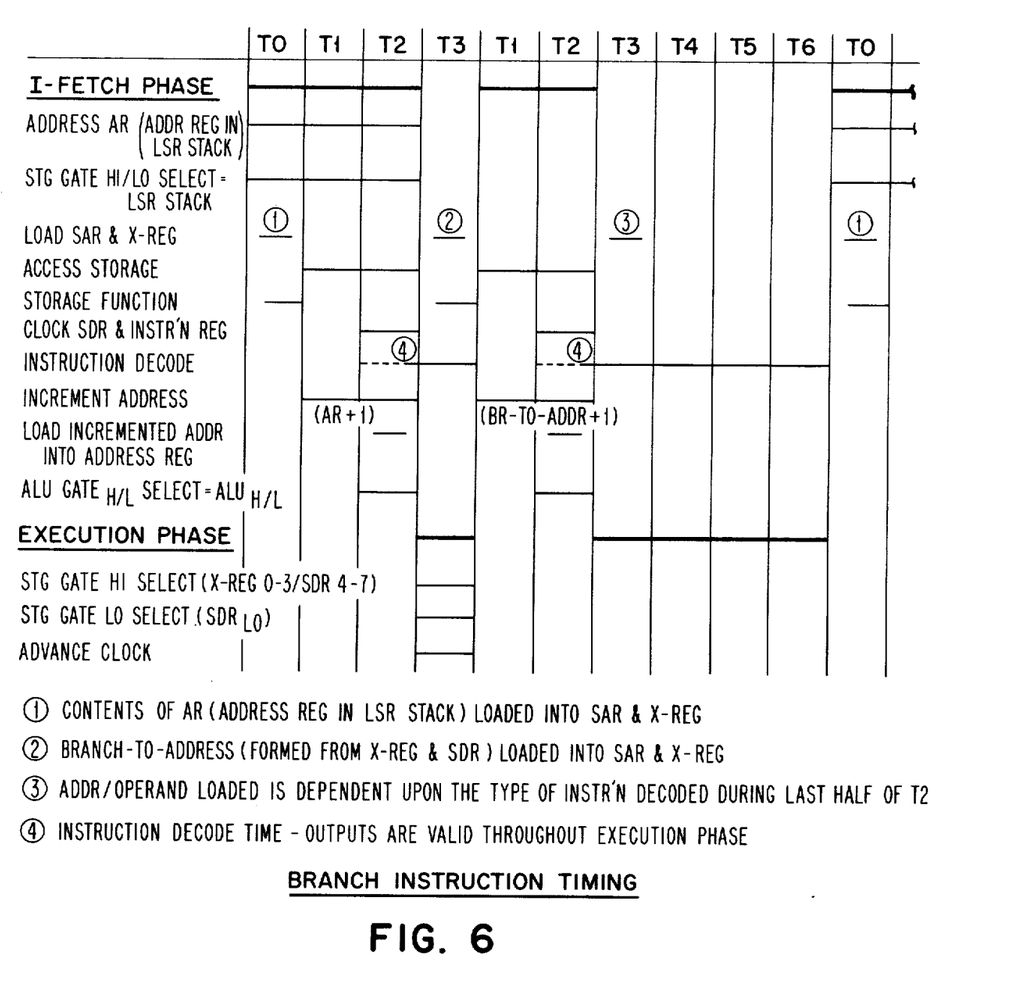
FIG. 6 is a timing diagram illustrating instruction fetch and execution times for branch instructions.

The fetch and execution of a branch instruction is shown in FIG. 6. The address in the address register 101 located in LSR's 100 is available at T0 time. At this time AND gates 81 and 86, FIG. 2, are conditioned to pass bits 8–15 and bits 0–7 from the address register 101 into SAR 15 and X register 130; these registers are clocked during T0 time at phase A. Also, during the latter half of T0 time, a Storage Function signal is generated by the instruction and function decode logic 50 and sent to storage clocks 3 to condition them to run. Then, with the address in SAR, a storage cycle is started at T1 time. The branch instruction accessed is put into SDR 25 and the instruction register 40, FIGS. 1 and 2 during T2 time. The address in the X register 130 is incremented by ALU 140 during T1–T2 time and the incremented address is loaded back into the address register 101 in LSR's 100 via AND circuits 161 and 167, FIG. 4.

The SAR 15 and X Register 130 are again loaded at T3 at phase A which also begins the execution phase of the branch instruction. The address loaded into SAR 15 and X Register 130, however, is not passed from the address register 101 because AND circuits 81 and 86 are not conditioned. During execution of the branch instruction, the address for the branch to instruction is formed from SDR bits 8–15 passed by AND circuit 82 which is conditioned by inverter 71 and by the branch instruction signal passed by AND circuit 57 to AND circuit 62 and through OR circuit 63 to AND circuit 82. The other bits forming the address are bits 4–7 from SDR 15 and bits 0–3 from the X Register 130 passed by AND circuit 89. Hence, at the end of the execution of the branch instruction, both SAR 15 and X register 130 contain the address of the branch to instruction. Further, during the latter half of T3 time, the Storage Function signal is activated again to condition storage clocks 3 to begin a storage cycle.

The branch instruction signal from AND circuit 57 also develops the ADVANCE CLOCK signal via OR circuit 59 and AND circuit 51 at T3 time. The ADVANCE CLOCK signal is passed by AND circuit 12 but inverted by inverter 21 so as to de-condition AND circuits 19 and 24 whereby the next pulse from oscillator 1 advances clock 30 into the T1 state, skipping T0.

The branch to instruction is fetched during T1 and T2 as a storage access is made using the address in SAR 15. Also, the branch to address in X register 130 is incremented by ALU 140 and entered into the address register 101 via ALU GATE 160. Then at T3 time during phase A, SAR 15 and X register 130 are clocked and the branch to instruction is executed. Execution of the branch to instruction and the data clocked into SAR 15 and X register 130 depends upon the type of instruction it is, and the execution of this instruction takes place from T3 time through T6 time.

Figure 7:
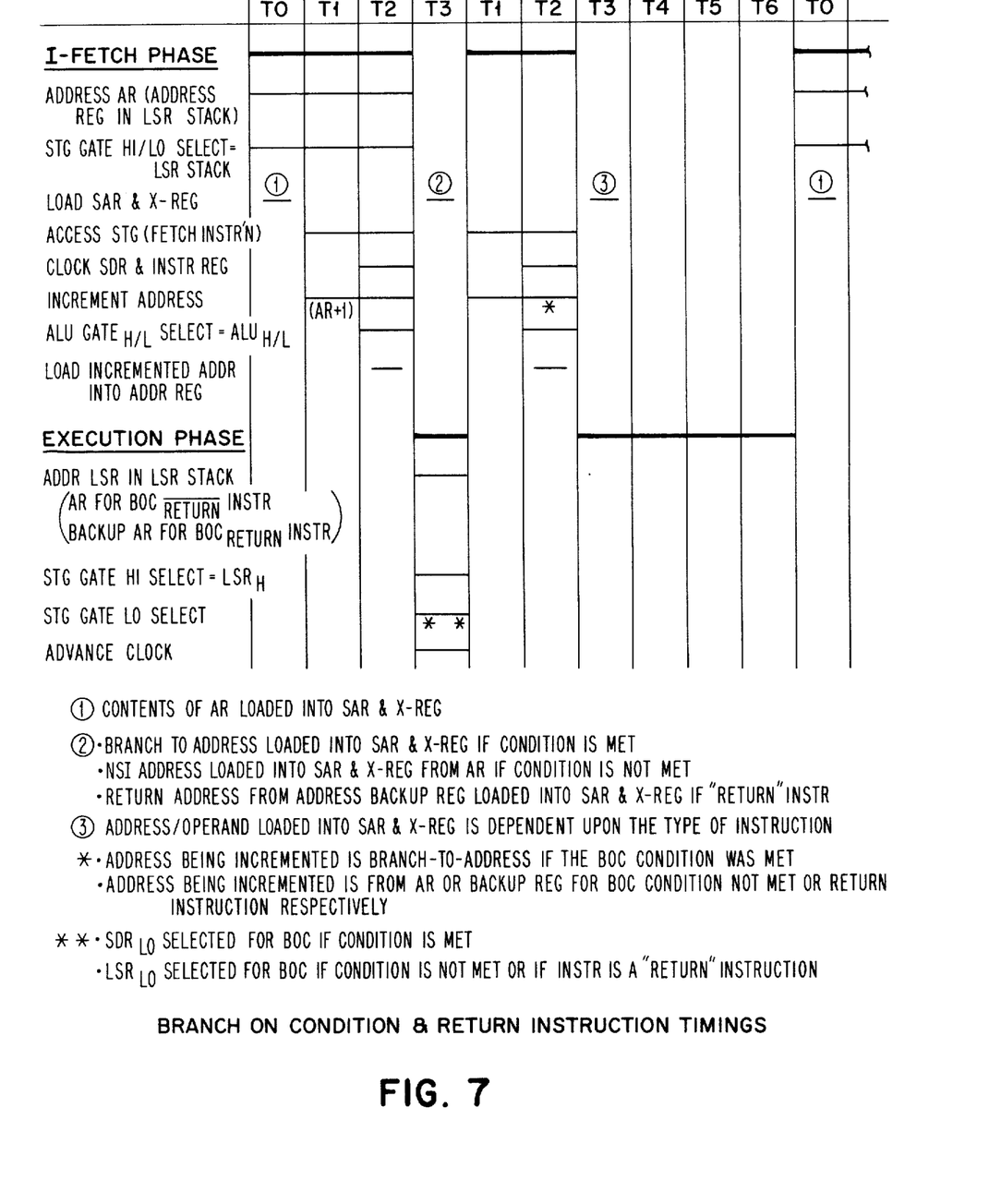
FIG. 7 is a timing diagram illustrating instruction fetch and execution times for branch on condition instructions.

The branch on condition instruction is fetched in a manner similar to the branch instruction. The branch to instruction is loaded into SAR 15 and X register 130 only if OR circuit 202, FIG. 2, is passing a signal to AND circuit 61 indicating tha the branch condition has been met. Assuming the branch condition is met, AND circuit 61 passes a signal via OR circuit 63 to AND circuits 82 and 84 at T3 time. The STORAGE GATE LO SEL 0 signal from decode circuit 47 is present during a branch on condition instruction to de-condition AND circuit 84, but AND circuit 82 is conditioned via inverter 71 to pass SDR 25 bits 8–15 to SAR 15 and X Register 130. Inverters 73 and 74 condition AND circuit 86 to pass bits 0–7 from the address register 101 to SAR 15 and X Register 130. These bits are passed irrespective if the branch condition is met, but AND circuit 81 would have passed bits 8–15 from the address register to SAR 15 and X Register 130 is the branch condition had not been met. Hence, it is seen that the next sequential address would have been loaded into SAR 15 and X Register 130 if the branch condition had not been met. As for the branch instruction, the Advance Clock and Storage Function signals are generated during T3 time to skip T0 time of the next instruction fetch.

Figure 9:
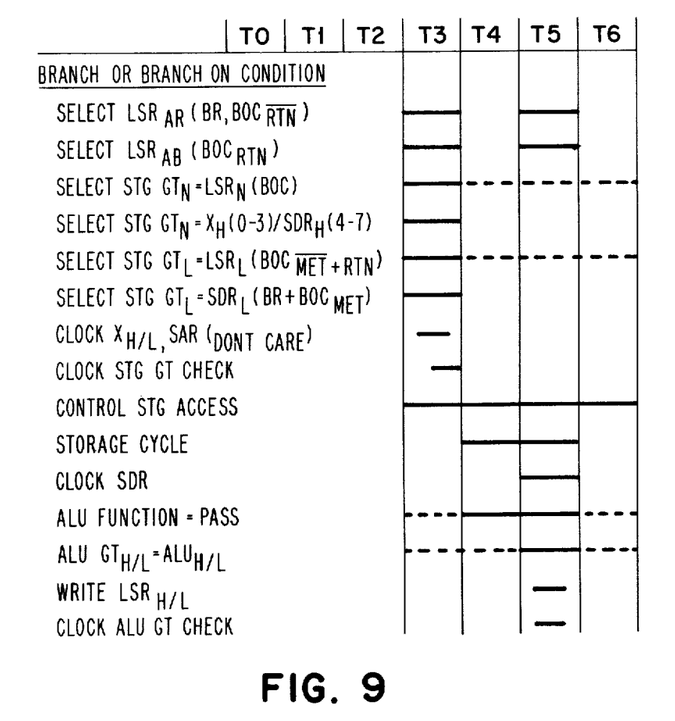

When operating in the stop or single step mode, the execution of the branch or branch on condition instruction continues through T6 time as illustrated in FIG. 9. This is because the clock 30 must always start at time T0, after a single step or stop operation.

What is claimed is:

1. Control apparatus for a stored program computer having an instruction cycle, said instruction cycle including an instruction fetch cycle, said instruction fetch cycle taking a finite period of time, said finite period of time including a portion of time for forming an address for the next instruction to be fetched, followed by an instruction execution cycle, said instruction execution cycle taking a finite period of time at least equal to said portion of time for forming an address for the next instruction to be fetched the improvement comprising
   means for fetching and executing instructions, decoding means connected to said means for fetching and executing instructions for identifying that the instruction fetched is a branch instruction;
   means connected to said means for fetching and executing instructions for forming the "branch to" instruction address during the execution of an instruction identified by said decoding means as a branch instruction and for furnishing said "branch to" instruction address to said means for fetching and executing instructions to enable the same to fetch said "branch to" instruction, and
   means responsive to said decoding means identifying the instruction fetched as a branch instruction for generating a control signal for skipping said portion of time for forming an address for the next instruction to be fetched during said instruction fetch cycle for said "branch to" instruction and furnishing said control signal to said means for fetching and executing instructions.

2. Control apparatus for a stored program computer having an instruction fetch cycle taking a finite period of time, said finite period of time including a portion of time for setting an address for the next instruction to be fetched, followed by an instruction execution cycle taking finite period of time at least equal to said portion of time for setting an address for the next instruction to be fetched and including storage means for storing instructions at addressable storage positions, storage addressing means connected to said storage means and selectively loadable with addresses for indicating storage positions at which data is to be stored or retrieved, address register means for receiving addresses for the next instruction to be fetched and providing said addresses to said storage addressing means, selectively operable means for transferring addresses from said address register means to said storage addressing means, instruction register means for receiving instructions retrieved from storage, timing means for providing a plurality of successive timing signals for controlling said instruction fetch and execution cycles by controlling the loading of said storage addressing means at a first time during said instruction fetch cycle and at a fourth time during said instruction execution cycle and controlling the loading of said instruction register means at a third time during said instruction fetch cycle, instruction decode means operative to decode instructions in said instruction register means to provide signals indicating the type of instruction, the improvement comprising:

address forming means responsive to said instruction decode means providing a signal indicating a branch instruction for forming an address for a "branch to" instruction, means for loading said address formed by said address forming means into said storage addressing means during said fourth time, and timing control means responsive to said signal indicating a branch instruction for causing said timing means to skip said first time of the instruction fetch cycle of said "branch to" instruction by advancing directly from said fourth time of said instruction execution cycle of the branch instruction to a second time of the instruction fetch cycle of said "branch to" instruction.

3. The control apparatus of claim 2 wherein said address forming means includes means for combining data from said address register with data from said branch instruction to form a "branch to" address.

4. The control apparatus of claim 3 wherein said combining means comprises AND circuitry gated by a signal occurring at said fourth time and said signal indicating a branch instruction and connected to pass predetermined bits from said address register with predetermined bits from said branch instruction to said storage addressing means upon being gated.

5. The control apparatus of claim 2 wherein said means for loading said address formed by said address forming means into said storage addressing means during said fourth time comprises logic circuitry gated by a signal occurring at said fourth time and connected to pass a signal to said storage addressing means.

6. The control apparatus of claim 2 wherein said timing control means comprises first logic circuitry gated by said signals indicating a branch instruction and said fourth time to generate an advance time signal, and second logic circuitry responsive to said advance time signal for switching said timing means into said second time immediately upon the termination of said fourth time.

7. Control apparatus for a stored program computer having an instruction fetch cycle followed by an instruction execution cycle and including storage means for storing instructions at addressable storage positions, storage addressing means connected to said storage means and selectively loadable with addresses for indicating storage positions at which data is to be stored or retrieved, address register means for providing addresses to said storage addressing means, selectively operable means for transferring addresses from said address register means to said storage addressing means instruction register means for receiving instructions retrieved from storage, timing means for providing a plurality of successive timing signals for controlling said instruction fetch and execution cycles by controlling the loading of said storage addressing means at a first time during said instruction fetch cycle and at a fourth time during said instruction execution cycle and controlling the loading of said instruction register means at a third time during said instruction fetch cycle, instruction decode means operative to decode instructions in said instruction registers, means to provide signals indicating the type of instruction, branch condition logic means responsive to said instruction decode means providing a signal indicating a branch on condition instruction for generating a signal indicating that the branch condition is met, the improvement comprising address forming means responsive to said instruction decode means providing a signal indicating a branch on condition instruction and responsive to said branch condition logic means providing a signal indicating that the branch condition is met for forming an address for a "branch to" instruction, means for loading said address formed by said address forming means into said addressing means during said fourth time, and timing control means responsive to said signal indicating a branch on condition instruction for causing said timing means to skip said first time on the instruction fetch cycle of the following instruction by advancing directly from said fourth time of said instruction execution cycle of the branch on condition instruction to a second time of the instruction fetch cycle of the following instruction.

8. Control apparatus for a stored program computer having storage means for storing instructions at addressable locations, selectively loadable storage addressing means connected for addressing said storage means, address register means for containing storage addresses, selectively operable address transfer means connected for transferring storage addresses from said address register means to said storage addressing means, a selectively loadable instruction register connected to receive instructions from said storage means, timing means for providing a plurality of sequentially occurring discretely identified timing signals, means responsive to timing signals identified as first and fourth timing signals for generating load signals for loading said storage addressing means, means responsive to timing signals identified as second timing signals for accessing said storage means to make instructions at the addressed location available therefrom, means responsive to timing signals identified as third timing signals for generating load signals for loading said instruction register with instructions from said storage means, instruction decode means connected to said instruction register and to said timing means for generating signals indicating the type of instruction contained in said instruction register, the improvement comprising:

address transfer control means responsive to said timing signal identified as a first timing signal for operating said selectively operable address transfer means connected for transferring storage addresses from said address register means to said storage addressing means, branch address forming means responsive to said instruction decode means providing a signal indicating a branch instruction for forming an address for a "branch to" instruction, means for transferring said "branch to" instruction address to said storage addressing means for loading therein by said load signal generated in response to said fourth timing signal, and timing control means responsive to said signal indicating a branch instruction for causing said timing means to skip said first timing signal whereby the next sequentially occurring timing signal is a second timing signal so that said address transfer control means is unable to operate said selectively operable address transfer means and the "branch to" address loaded into said storage addressing means addresses said storage means.

* * * * *